G. WILSON.
MILK BOTTLE HOLDER.
APPLICATION FILED JAN. 12, 1920.
1,356,480.
Patented Oct. 19, 1920.
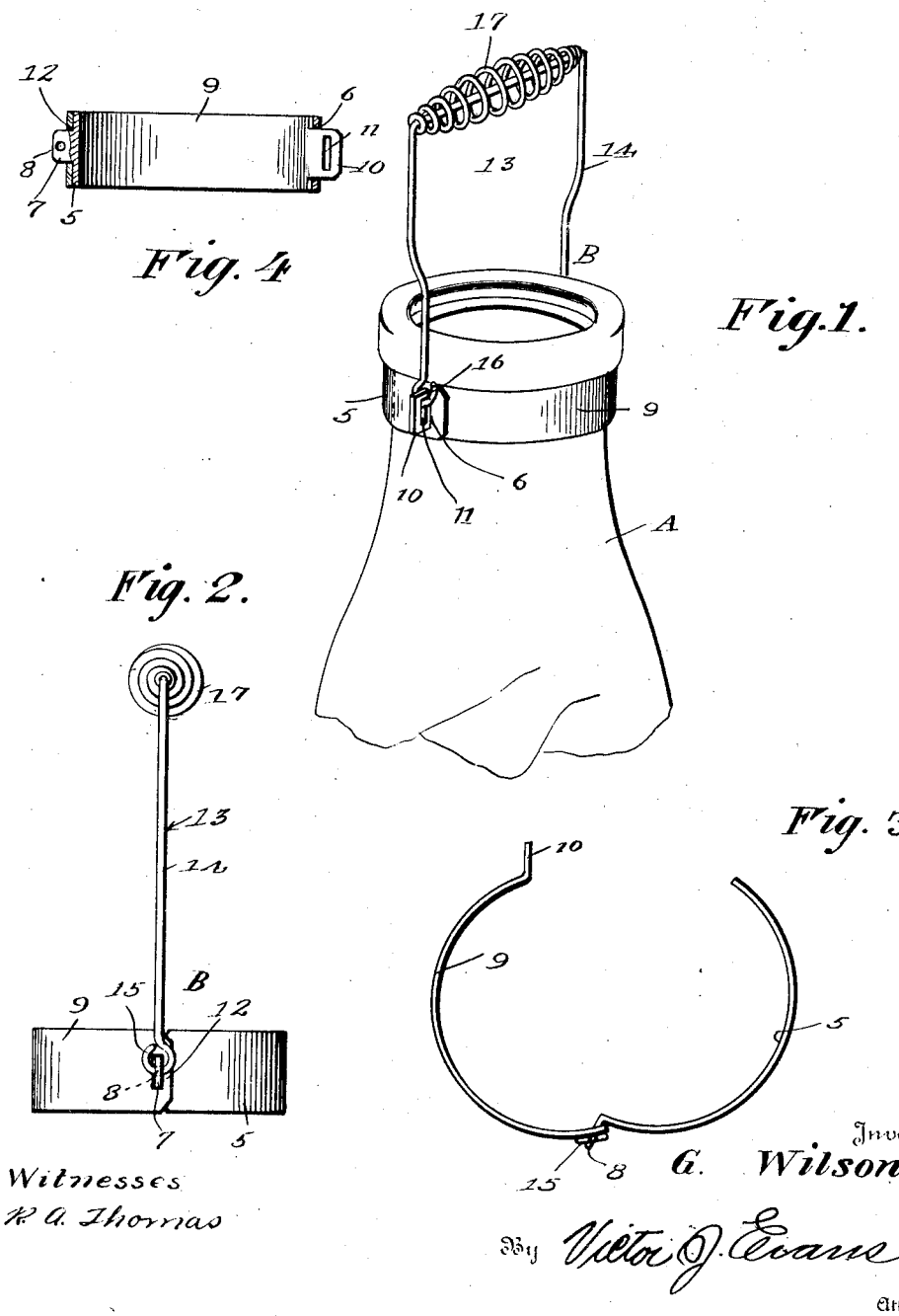

UNITED STATES PATENT OFFICE.

GEORGE WILSON, OF LINCOLN, NEBRASKA.

MILK-BOTTLE HOLDER.

1,356,480. Specification of Letters Patent. Patented Oct. 19, 1920.

Application filed January 12, 1920. Serial No. 350,879.

*To all whom it may concern:*

Be it known that I, GEORGE WILSON, a citizen of the United States of America, residing at Lincoln, in the county of Lancaster and State of Nebraska, have invented new and useful Improvements in Milk-Bottle Holders, of which the following is a specification.

This invention relates to carrying devices and has for its object the provision of a device in the nature of a clamp engageable about the neck of a milk bottle and provided with a handle connected with the clamp whereby the bottle may be conveniently carried without danger of dropping the same, the connection of the handle with the clamp being such as to hold the clamp in operative engagement and to prevent disconnection of the parts thereof.

An important object is the provision of a device of this character which will be extremely simple and inexpensive in manufacture, highly efficient and durable in use, and a general improvement of the art.

With the above and other objects and advantages in view, the invention consists in the details of construction to be hereinafter more fully described and claimed, and illustrated in the accompanying drawings, in which:—

Figure 1 is a perspective view of the device applied to a milk bottle.

Fig. 2 is an elevation looking toward the pivoted end of the clamping member, and Fig. 3 is a plan view of the clamping portion of the device with the member swung to open position.

Fig. 4 is a cross sectional view taken centrally through the device and showing the points of connection of the two clamping members.

Referring more particularly to the drawings, the letter A designates a milk bottle and the letter B designates my carrier as a whole.

In carrying out my invention I provide a pair of ring members formed preferably of metal or any suitable wire. One ring member 5 is provided at one end with an elongated slot 6 and at its other end with a laterally deflected ear 7 provided with a hole 8. The other ring member 9 is provided at one end with a laterally deflected ear 10 provided with an elongated slot 11 and is provided at its opposite end with a slot 12.

The slots 6 and 12 are of a size to receive the ears 7 and 10.

The handle is designated by the numeral 13 and comprises a U-shaped yoke 14 having the ends of its arms provided with eyes or loops 15 and 16. It will be noted that the loop 16 is more open than the loop 15 for a purpose to be described. The bight portion of the yoke 14 has secured thereon an open coil 17 of suitable wire which forms a hand engaging portion of the handle.

In the assembling of the device, the ear 7 of the member 5 is inserted through the slot 12 in the member 9 and the loop 15 at the end of one arm of the yoke 14 is engaged within the hole 8 in the ear 7. This connection constitutes the pivoting of the ring members 5 and 9. The parts being thus connected, the device is applied to a milk bottle by engaging the ring members 5 and 9 upon the neck thereof, after which the ear 10 is passed through the slot 6 and the open loop 16 on the handle engaged within the slot 11 in the ear 10. This connection will hold the members securely together in encircling relation to the neck of the milk bottle. The bottle may then be readily carried by engaging the hand about the yoke 14 and danger of dropping the bottle will be reduced to the minimum. In order to disengage the device from the bottle, it is merely necessary that the loop 16 be disengaged from the slot 11 in the ear 10, after which the ring members 5 and 9 are swung apart and the device removed from the bottle.

From the foregoing description and a study of the drawings it will be apparent that I have thus provided an extremely simple device which may be very quickly and easily engaged about the neck of a milk bottle and which is so constructed that the bottle may be readily carried without danger of dropping the same.

While I have shown and described the preferred embodiment of the invention, it will of course be readily understood that I have reserved the right to make such changes in the form, construction and arrangement of parts as will not depart from the spirit of the invention nor the scope of the subjoined claims.

Having thus described my invention, I claim:—

1. A device of the character described comprising a pair of semi-circular ring members pivotally connected at one end and detachably connected at their other ends, and a handle member of U-shape having the ends of its arms connected with said clamping members at their points of connection.

2. A device of the character described comprising a pair of semi-circular ring members pivotally connected at one end and detachably connected at their other ends, and a handle member of U-shape having the ends of its arms connected with said clamping members at their points of connection, the extremity of one arm serving as a pivotal connection of said clamping members and the extremity of the other arm preventing disengagement of the other ends of the clamping members from each other.

In testimony whereof I affix my signature.

GEORGE WILSON.